(12) United States Patent
He et al.

(10) Patent No.: US 8,566,372 B2
(45) Date of Patent: Oct. 22, 2013

(54) METHOD AND DEVICE FOR DYNAMICALLY LOADING RELOCATABLE FILE

(75) Inventors: Haijian He, Shenzhen (CN); Xiaohui Wu, Shenzhen (CN); Wei Fan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,431

(22) PCT Filed: Jul. 21, 2010

(86) PCT No.: PCT/CN2010/075368
§ 371 (c)(1),
(2), (4) Date: May 3, 2012

(87) PCT Pub. No.: WO2011/054223
PCT Pub. Date: May 12, 2011

(65) Prior Publication Data
US 2012/0209895 A1 Aug. 16, 2012

(30) Foreign Application Priority Data

Nov. 4, 2009 (CN) .......................... 2009 1 0210623

(51) Int. Cl.
*G06F 17/30* (2006.01)

(52) U.S. Cl.
USPC .......................................... 707/825; 711/124

(58) Field of Classification Search
USPC ......... 707/825, 674, 802, 796, 634, 703, 758, 707/769, 622, 783, E17.005, E17.007, 707/E17.014, E17.032, E17.045; 717/124, 717/140, 147, 162; 719/328; 718/104; 703/10; 455/452.1, 186.1, 453, 455/FOR. 244
See application file for complete search history.

(56) References Cited

U.S. PATENT DOCUMENTS 5,291,601 A * 3/1994 Sands ............................ 719/331
5,604,864 A * 2/1997 Noda ............................ 711/201

(Continued)

FOREIGN PATENT DOCUMENTS

| CN | 101004681 A | 7/2007 |
|----|----|----|
| CN | 101470619 A | 7/2009 |
| CN | 101697131 A | 4/2010 |

OTHER PUBLICATIONS

Adam et al.—"Run-time Dynamic Linking for Reprogramming Wireless Sensor Networks"—Proceedings of the 4th International Conference on Embedded Networked Systems—SunSys '06 Nov. 1-3, 2006, ACM 2006 (pp. 15-28).*

(Continued)

*Primary Examiner* — John E Breene
*Assistant Examiner* — Anh Ly
(74) *Attorney, Agent, or Firm* — Oppedahl Patent Law Firm LLC

(57) ABSTRACT

The disclosure provides a method for dynamically loading a relocatable file, comprising: analyzing the relocatable file; searching for a relocation section according to the information obtained through the analysis; obtaining a relocation target address after the relocation section is found and calculating an address to be relocated and a skipping distance; determining whether the skipping distance exceeds a range of a short skipping, and if the skipping distance does not exceed the range of the short skipping, then writing the relocation target address into the address to be relocated to perform relocation loading; if the skipping distance exceeds the range of the short skipping, then adding a veneer code segment and making the skipping whose distance exceeds the range of the short skipping indirectly skip to the relocation target address to perform relocation loading. Accordingly, the disclosure provides a device for dynamically loading a relocatable file, comprising: an analyzing module, a calculating module, a searching module, a determining module, and a relocation dynamic loading module. With the solution, dynamically loading a relocatable file can be realized when the calling distance of a function exceeds the range of the short skipping.

17 Claims, 3 Drawing Sheets

(56) References Cited

U.S. PATENT DOCUMENTS

| | | | |
|---|---|---|---|
| 5,764,987 A * | 6/1998 | Eidt et al. | 717/100 |
| 5,933,642 A * | 8/1999 | Greenbaum et al. | 717/140 |
| 6,002,876 A * | 12/1999 | Davis et al. | 717/162 |
| 6,108,759 A * | 8/2000 | Orcutt et al. | 711/173 |
| 6,219,830 B1 * | 4/2001 | Eidt et al. | 717/139 |
| 6,687,899 B1 * | 2/2004 | Shann | 717/162 |
| 6,708,330 B1 * | 3/2004 | Moberg et al. | 717/158 |
| 6,802,606 B2 * | 10/2004 | Roffman et al. | 351/159.08 |
| 7,584,473 B2 * | 9/2009 | Forin et al. | 718/100 |
| 7,735,075 B2 * | 6/2010 | Fan et al. | 717/162 |
| 2002/0138748 A1 * | 9/2002 | Hung | 713/190 |
| 2003/0140338 A1 * | 7/2003 | Bowers et al. | 717/162 |
| 2003/0217197 A1 * | 11/2003 | Chan et al. | 709/331 |
| 2005/0136939 A1 * | 6/2005 | Mountain et al. | 455/453 |
| 2005/0226406 A1 * | 10/2005 | Forin et al. | 380/1 |
| 2006/0277541 A1 | 12/2006 | Sproul et al. | |
| 2007/0130565 A1 * | 6/2007 | Fan et al. | 717/173 |
| 2008/0163375 A1 * | 7/2008 | Savagaonkar et al. | 726/26 |
| 2012/0011367 A1 * | 1/2012 | Denison | 713/170 |
| 2012/0204067 A1 * | 8/2012 | Matei et al. | 714/47.1 |

OTHER PUBLICATIONS

Adam Dunkels, Niclas Finne, Joakim Eriksson, and Thiemo Voigt—"Run-time dynamic linking for reprogramming wireless sensor networks"—Proceeding SenSys '06 Proceedings of the 4th international conference on Embedded networked sensor systems—Nov. 1-3, 2006—pp. 15-28.*

Shann, Richard—"A relocation format for linking"—European Patent Application EP1085410 A2—Application No. EP20000307544 Publication Date:Mar. 21, 2001 Filing Date:Sep. 1, 2000—(pp. 1-23).*

International Search Report in international application No. PCT/CN2010/075368, mailed on Nov. 25, 2010.

English Translation of the Written Opinion of the International Search Authority in international application No. PCT/CN2010/075368, mailed on Nov. 25, 2010.

Supplementary European Search Report in European application No. 10827837.5, mailed on May 23, 2013.

RealView Compilation Tools, Version 3.0, Linker and Utilities Guide.

RealView Compilation Tools, Version 3.0, Assembler Guide.

* cited by examiner

METHOD AND DEVICE FOR DYNAMICALLY LOADING RELOCATABLE FILE

TECHNICAL FIELD

The disclosure relates to an embedded microkernel operating system and in particular to a method and device for dynamically loading a relocatable file.

BACKGROUND

With the development of science and technology, mobile phones show a personal computerized development trend, which requires more and more dynamic application files. Mobile phones are generally divided into smart phones and feather phones. Smart phones, such as wince operating system and ulinux operating system, etc, basically realize dynamic loading technology, such as a dynamic link library of a Windows operating system or a dynamically shared file of a linux operating system which can be dynamically loaded on a Personal Computer (PC); while most of the feather phones are developed based on the embedded microkernel operating system, and dynamic loading technology has not yet been implemented on most of the embedded operating systems.

So far, the market share of feather phones is still high, and there are generally two application development modes for feather phones: one mode is to use JAVA language, and the other mode is statically linked to a version. Wherein JAVA is an explanatory language and slow in operating speed, and meanwhile requires support from JAVA virtual machine; while for compiling and generating an executable file by static link between a traditional application and a mobile phone version, the larger the file, the larger the required capacity of the hardware resource, such as the Random Access Memory (RAM) or the nonvolatile or NOR FLASH, and since the code will be frequently modified in the debugging process, the overall mobile phone version has to be re-linked, burned and loaded each time that the code is modified, thus modifying the code takes even more time than debugging the code, which seriously affects the efficiency of application development and debugging. In addition, when the code is directly run on a mobile phone having NOR FLASH, the above phenomenon is even more serious since the burning time is long, and the efficiencies of application development and debugging are particularly low. Meanwhile, the telecom operators have demand on dynamically upgrading an application, while the statically linked application cannot be dynamically upgraded.

Presently, the dynamic linking technology is implemented in the microkernel operating system, which improves the software development efficiency, the loading is performed as required in order to save hardware resources, and new functions can be added to a mobile phone at any time. Wherein the dynamic loading process mainly comprises three processes: calculating and allocating memory required for loading the code, symbol analyzing and code relocating. However, in the prior art, during the relocation process, when the address distance between a function caller and a callee is too far and exceeds a range of the short skipping, it will cause failure in dynamic loading, or error in dynamic loading of the dynamic application file.

SUMMARY

In view of the above mentioned, the disclosure mainly aims to provide a method and device for dynamically loading a relocatable file, so that dynamically loading of the relocatable file can be realized when the calling distance of the function exceeds the range of the short skipping.

To achieve the above purpose, the disclosure provides a method for dynamically loading a relocatable file, comprising: analyzing the relocatable file, searching for a relocation section according to information obtained through the analysis, and obtaining a relocation target address after the relocation section is found and calculating an address to be relocated and a skipping distance; and determining whether the skipping distance exceeds a range of a short skipping, if the skipping distance does not exceed the range of the short skipping, then filling the relocation target address into the address to be relocated to perform relocation loading; if the skipping distance exceeds the range of the short skipping, then adding a veneer code and making a skipping exceeding the range of the short skipping skip indirectly to the relocation target address to perform relocation loading.

Wherein before analyzing the relocatable file, the method may further comprise: generating a system symbol table; recombining the relocatable file according to attributes of sections of the relocatable file, calculating and allocating memory space required for loading a code of a dynamic application file, and calculating an initial address of each code segment, reading section content of the relocatable file, and writing the content into the allocated memory space of the section correspondingly; wherein recombining the relocatable file comprises: ranking sections of three segments of TEXT, DATA and BSS to which the relocatable file belongs in an ascending order based on section names and section serial numbers, and ranking in the ascending order based on the section names is preferred.

In the above method, obtaining the relocation target address may comprise: analyzing the relocatable file to obtain a section header of a symbol section, traversing a section header table of the relocatable file according to a sh_type field of the section header, and searching for the symbol section of the relocatable file; determining whether a symbol of the relocatable file is an undefined symbol according to a st_shndx field of a symbol item of the symbol section; when the symbol of the relocatable file is an undefined symbol, searching the system symbol table to obtain a symbol address of the undefined symbol, and using the symbol address of the undefined symbol as an external symbol address referenced by the dynamic application file; the external symbol address referenced by the dynamic application file is the relocation target address.

Wherein adding the veneer code may comprise: generating the veneer code, and filling a long skipping instruction and the referenced external symbol address into the veneer code, respectively; filling an initial address of the veneer code into the address to be relocated to form an effective short skipping, an effective short skipping instruction directs to the veneer code; making the skipping exceeding the range of the short skipping skip indirectly to the relocation target address comprises: skipping to the veneer code through the effective short skipping, then skipping to the referenced external symbol address through a long skipping of the veneer code.

In the method, calculating the address to be relocated may comprise: obtaining an offset of a relocated position in an affiliated section according to relocation information; and obtaining the address to be relocated by adding the obtained offset to an initial address of the affiliated section.

wherein after the relocation section is found, the method may further comprise: determining whether relocation items have been traversed completely, and if the relocation items have not been traversed completely, then obtaining the relocation target address; if the relocation items have been traversed completely, then determining whether the section header table has been traversed completely, and if the section header table has not been traversed completely, keeping on searching to determine whether there is relocation section; if the section header table has been traversed completely, ending the relocatable dynamic loading process.

To realize the above method, the disclosure further provides a device for dynamically loading a relocatable file, comprising: an analyzing module, a calculating module, a searching module, a determining module and a relocation dynamic loading module; wherein the analyzing module is configured to analyze the relocatable file; the searching module is configured to search for a relocation section according to information obtained by the analyzing module, and obtain a relocation target address; the calculating module is configured to calculate an address to be relocated and a skipping distance; the determining module is configured to determine whether the skipping distance exceeds a range of a short skipping, and inform a result of determining to a relocation dynamic loading module; the relocation dynamic loading module is configured to fill the relocation target address into the address to be relocated; and add a veneer code, transform a short skipping exceeding the range of the short skipping into an effective short skipping and a long skipping, skip to the veneer code through the effective short skipping, and then skip to the relocation target address to perform relocation dynamic loading.

Wherein the device may further comprise: a recombining module and a memory dividing module; wherein the recombining module is configured to rank sections of three segments of TEXT, DATA and BSS to which the relocatable file belongs in an ascending order based on section names and section serial numbers, and ranking in the ascending order based on the section names is preferred; the memory dividing module is configured to calculate and divide memory space required for loading a code of a dynamic application file, and read section content of the relocatable file, and write the content into the memory space of the section correspondingly; the calculating module is further configured to calculate initial addresses of each code segment and each section.

The device may further comprise: a first traversing module and a second traversing module; wherein the first traversing module is configured to traverse a section header table, and inform the searching module when the traversal is completed; the second traversing module is configured to traverse a relocation item, and inform the calculating module when the relocation item is started to be traversed, and inform the first traversing module when the relocation item is not traversed; the searching module is further configured to inform the second traversing module when the relocation section is found.

Wherein the relocation dynamic loading module may comprise: an adding unit configured to add the veneer code; a transforming unit configured to transform the short skipping exceeding the range of the short skipping into an effective short skipping and a long skipping, skip to the veneer code through the effective short skipping, and skip to a referenced external symbol address through a long skipping instruction of the veneer code.

It can be seen from the above technical solution that, through the method for dynamically loading the relocatable file provided by the disclosure, the problem of dynamic loading fails due to that the address distance between the function caller and the callee is too far and exceeds the range of the short skipping in the process of dynamically loading the relocatable file is solved. That is to say, when the relocatable file is dynamically loaded, the disclosure transforms a short skipping exceeding the range of the short skipping into an effective short skipping and a long skipping, so that dynamically loading the relocatable file could be realized when the calling distance of the function exceeds the range of the short skipping.

In addition, the disclosure adopts a mode in which the applications and mobile phone platforms are developed independently, such that when a dynamic application file needs to be modified, it only needs to independently compile the dynamic application file which needs to be modified without performing operations of re-fabricating, burning, loading and the like on the platform version. In this way, a large amount of time is saved in order to concentrate on debugging the application itself, which greatly improves the application development efficiency.

The application and mobile phone platforms are linked at the PC side originally, now they are linked in the mobile phone by the disclosure, which greatly benefits the expansion of the functions of the mobile phone platform, such as updating the dynamic application files. Furthermore, requirements in many aspects can be satisfied through upgrading the existing dynamic application files during the operation, for example, updating/downloading the latest dynamic application files.

To sum up, through the method and device for dynamically loading the relocatable file according to the disclosure, the software development efficiency can be improved, the hardware resource is saved due to that the loading is performed as required, and the requirements of the telecom operators are met; furthermore, new functions can be added to a mobile phone at any time. In particular, when the skipping distance exceeds the range, a short skipping exceeding the range can be transformed into an effective short skipping and a long skipping to realize relocatable dynamic loading.

DETAILED DESCRIPTION

Figure 1:
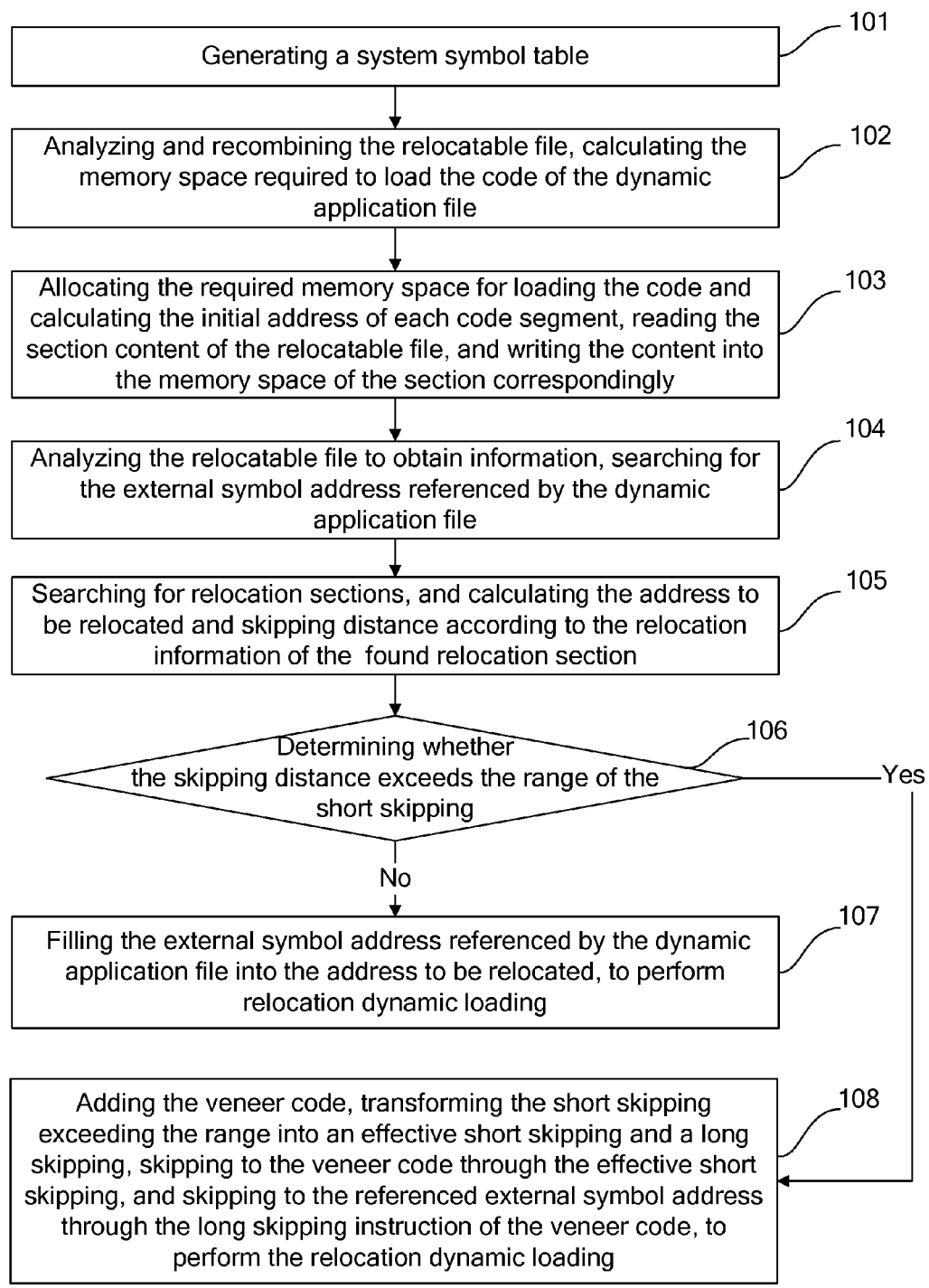
FIG. 1 shows a schematic flowchart illustrating the implementation of a method for dynamically loading a relocatable file according to the disclosure.

The basic thought of the disclosure lies in that: transforming a short skipping exceeding the range of the short skipping into an effective short skipping and a long skipping in order to realize dynamic loading of the relocatable file when the function calling distance exceeds the range of the short skipping.

It should be pointed out that in the disclosure, the function calling distance during the skipping process is called skipping distance.

It should be illustrated that most of the embedded devices adopted by the disclosure use the Advanced RISC (Reduced Instruction Set Computing) Machine (ARM) processor, the dynamically loaded relocatable file uses the linking view of the Executable and Linking Format (ELF), and uses the software in ELF format during the debugging operation. Wherein the relocatable file is the target file compiled by the ARMCC compiler at the PC side, comprising the target file suitable for being partially linked with other target files. The relocatable file has a plurality of formats, such as Portable Executable (PE) file format of Windows, ELF file format. In this embodiment, the format of the relocatable file uses ELF format.

Here, it can be known from the architecture of ARM that, the ARM linker (ARMLINK) provides some small segments of codes in the linking process for realizing transformation from ARM state to thumb state, and realizing long distance skipping. Generally, these small segments of codes are called state switching codes, such as veneer code. Since the relocatable target files generated by different compilers may be different, that is to say, the veneer code is related to the compiler, for example: GNU Compiler Collection (GCC) compiler has a -mlong option, which can directly compile a skipping instruction into a long skipping. However, an ARMCC compiler of lower version does not have a similar attribute, the generated relocatable files are all short skipping instructions, and the range of the short skipping is between +32M to −32M, a skipping can only be transformed into a long skipping as required in the ARMLINK linking process.

The memory address of the dynamic loading file is generally allocated in the memory of the mobile phone system heap, and the relocatable file is generated by the ARMCC compiler. However, when the loading relocation target address is too far from the address of the system code, then in the relocation process, the distance between the function caller and the callee may exceed the range of the short skipping, thus lead to failure in the relocation. Therefore, in the relocation process, it is necessary to transform a short skipping exceeding the range of the short skipping into a long skipping instruction, i.e. generating a veneer code, wherein the veneer code plays a role of realizing a long distance skipping. It can be known from the ARM architecture that, the long skipping can be realized by directly assigning a value to a PC register, but directly changing the short skipping instruction to use the address of immediate data (i.e. symbol) would cause a problem to the PC assignment instruction: every immediate data is obtained by circularly shifting an eight-bit constant rightwards for even bits, and not every 32-bit constant is a legal immediate data. Then, an indirect method is required for transforming a short skipping exceeding a range into an effective short skipping and a long skipping. Therefore, the disclosure adopts the veneer code to realize the long skipping, wherein the veneer code occupies two assembly instructions (i.e. eight bytes), the first four bytes are used for storing the long skipping instruction, and the last four bytes are used for storing the external symbol address referenced by the dynamic application file (i.e. the relocation target address). In this way, when relocating an external symbol exceeding the short skipping distance range, dynamic loading is realized by skipping to the veneer code through the effective short skipping, and skipping to the external symbol address referenced by the dynamic application file through the long skipping instruction of the veneer code. Wherein the effective short skipping refers to the skipping not exceeding the range of the short skipping.

To make the purposes, characteristics and advantages of the disclosure more obvious and easy to be understood, the disclosure is further described below in detail with reference to accompanying drawings and specific embodiments.

The realization of the relocatable dynamic loading of the disclosure is equivalent to the solution of providing a simplified loading linker in the embedded microkernel operating system of the mobile phone, such that the development mode and function calling relation of the dynamic application file substantially consistent with that of the static application, without modifying the dynamic application file. Here, the method for dynamically loading a relocatable file according to the disclosure is illustrated in FIG. 1, which mainly comprises the following steps.

Step 101, generating a system symbol table;

wherein the main components of the system symbol table comprise: a symbol name and a symbol address, and the system symbol table is generated by a mobile phone platform (hereinafter referred to as platform), and its generation process comprises: binding the symbol name and symbol address which are provided outwardly by the static version together to constitute a static array; when the system of the mobile phone is initialized, the static array is organized in the way of a hash table to be inquired during dynamically loading of the dynamic application file.

Wherein the generation of the static array can be generated by an array generation tool through two compilations, namely: during the first compilation, setting the static array to be null, and compiling and linking the platform version to generate an executable file having symbol information, scanning the executable file to obtain the symbol name, and then generating the static array; when performing the second compilation, obtaining the symbol address through a programming grammar, filling the symbol address into the static array by the compiler; and then, when the system of the mobile phone is initialized, the static array is stored in the form of a hash table to facilitate subsequent symbol searching.

Step 102, analyzing and recombining the relocatable file, calculating the memory space required to load the code of the dynamic application file;

in this step, the device for dynamically loading the relocatable file analyzes the relocatable file according to the fields of the section header, such as sh_type or the like, and conforms to the ELF file format; extracts information such as operation, relocation or the like obtained through analysis and write the information into the memory, performs recombination according to the information such as the attribute of the section of the relocatable file, and calculates the memory space required for loading the code of the dynamic application file.

Note that, the executable file, such as the dynamic application file, consists of three segments: a TEXT segment, a DATA segment and an uninitialized data segment (Block Started by Symbol (BSS)), wherein the TEXT segment is used for storing the dynamic application file code determined during compiling and is in read-only format; the DATA segment is used for storing data that can be determined at the compiling stage and is readable and writable, and the DATA segment is generally referred to as static memory area, in which global variables and static variables assigned with initial values, and the constant are stored; the BSS segment is used for storing the defined global variables and static variables, which are not assigned with initial values.

The main recombination processes are as follows: the relocatable file adopts the linking view of the ELF, thus firstly, the type of the affiliated segment is determined according to the sh_type and sh_flag fields of the section header table of the relocatable file, and then the section header tables in the TEXT segment, the DATA segment and the BSS segment are ranked in ascending order based on a certain order, such as the section names and the section serial numbers, and the section names is preferred, that is, if the section names are the same, the section header tables are then ranked in an ascending order based on the section serial numbers. Then, the memory size required by each code segment and the total memory sizes are calculated, according to the section alignment constraint sh_addralign field and the section size sh_size field of the section header table. Wherein the section header table is determined by the ELF file format, and comprises a plurality of section headers, and is copied from the relocatable file to the memory, and will be released after the relocation is completed.

It should be pointed out that, since the cascade ways of different linkers or different linker versions may be different, in order to facilitate debugging of the dynamic application file without affecting the operation of the dynamic application file, it is necessary that the way in which the sections in the TEXT segment, the DATA segment and the BSS segment are ranked should be consistent with the cascade way of the linker at the PC side. Here, the purpose of cascading the section header tables within the TEXT segment according to a certain order is to be consistent with the order generated by the linker at the PC side, while the linker at the PC side ranks the DATA segment and the BSS segment according to the section serial numbers.

Step 103, allocating the required memory space for loading the code and calculating the initial address of each code segment, reading the section content of the relocatable file, and writing the section content into the allocated memory space of the allocated section correspondingly;

here, after the device for dynamically loading the relocatable file calculates the memory space required for loading the code, the device allocates the required memory space for loading the code, and calculates the initial address of each code segment and each section according to the information, such as the size, the order and the address of each section or the like. The section contents belonged to the TEXT segment, DATA segment and BSS segment are directly read from the relocatable file to the memory space of the section according to the sh_offset field and sh_size field of the section header table.

Step 104, analyzing the relocatable file to obtain information, searching for the external symbol address referenced by the dynamic application file;

here, the information comprises: the string information, the symbol information, the section information and the relocation information; wherein the relocation information is determined by the ELF file format, and the external symbol address referenced by the dynamic application file is the relocation target address.

The ELF file specifies that, besides a normal section, the relocatable file currently includes only one symbol section, through which the symbol of the relocatable file can be found, and the symbol is a function or a variable used by the dynamic application file. Specifically, the symbol section of the relocatable file is searched by analyzing the relocatable file to obtain the symbol section header, and traversing the section header table according to the sh_type field of the section header; the sh_link field of the symbol section header indicates the string section index corresponding to the symbol; the string index is used for locating the symbol name in the string section, and the position of the corresponding string section in the file can be found in the section header table through the string section index, and then the string section is copied into the memory, the string section will be used in the relocation process, and the string section is released and deleted after being used. The symbol section consists of a plurality of symbol items, wherein the st_shndx field of the symbol item indicates the section where the symbol definition is located, and whether the symbol is undefined or defined can be determined according to the st_shndx field:

1) for the defined symbol, obtaining the symbol address according to the initial address of the section where the symbol definition is located and the st_value field of the symbol item, and adding the symbol information to the hash symbol table of the dynamic application file, i.e. the dynamic application file symbol table, for the subsequent function calling of the dynamic application file; wherein the symbol information, which comprises symbol name and symbol address, is organized in the dynamic loading process; for example, when it is required to call the interface provided outwardly by the dynamic application file, the function address of the dynamic application file can be obtained by searching the dynamic application file symbol table through the function name (i.e. the symbol name). Here, the defined symbols are divided into local symbols and global symbols, which can be distinguished according to the st_info field of the symbol item; furthermore, during the loading, only the global symbol may be add to the dynamic application file symbol table, since the local symbol has less impact on the loading, operating and debugging of the dynamic application file;

2) for the undefined symbol, the symbol address of the undefined symbol is obtained through searching the system symbol table; the undefined symbol is the external symbol referenced by the dynamic application file; here, the undefined symbol is a key of relocation, if the undefined symbol cannot be found, the loading of the relocatable file fails, and even if the loading continues and the loading is success, it is not sure that the dynamic application file would run correctly.

3) establishing a symbol array in the memory according to the number of symbol items, binding the symbol index with the calculated or found symbol address and symbol type, and the symbol index is in one-to-one correspondence with the array subscript, which can be used in subsequent relocation. High 24-bit of r_info field of the relocation item, i.e. r_info>>8, represents the index of the symbol corresponding to the relocation item in the symbol section, and the absolute address of the symbol can be found by searching the symbol array through the index; the symbol array will be released after the relocation is completed, and the symbol array is the form of expression of the symbol section in the memory.

Step 105, searching for relocation sections, and calculating the address to be relocated and skipping distance according to the relocation information of the found relocation section;

wherein the address to be relocated provides the absolute address applicable to the relocation action, and the relocation refers to a process of connecting a symbol reference with a symbol definition.

Note that, the address to be relocated can be calculated through the following way: obtaining the offset of the relocated position in the affiliated section according to the relocation information; adding the obtained offset to the initial address of the affiliated section, such that the address to be relocated is obtained.

Step 106, determining whether the skipping distance exceeds the range of the short skipping, and if the skipping distance does not exceed the range of the short skipping, then executing step 107; if the skipping distance exceeds the range of the short skipping, then executing step 108.

Step 107, filling the external symbol address referenced by the dynamic application file into the address to be relocated, to perform relocation dynamic loading;

during the dynamic loading process, the code relocation refers to a process of linking the symbol reference with the symbol address, for example: when the program calls a function, relevant calling instruction must transmit a control to an appropriate target execution address. After finding the symbol address of the undefined symbol in the system symbol table, filling the symbol address of the undefined symbol into the address to be relocated. Wherein the undefined symbol is the external symbol referenced by the dynamic application file, and the symbol address of the undefined symbol is the address of the external symbol referenced by the dynamic application file. In this embodiment, the symbol address of the undefined symbol adopts its absolute address, which is the target address for relocation as well.

Step 108, adding the veneer code, transforming the short skipping exceeding the range into an effective short skipping and a long skipping, skipping to the veneer code through an effective short skipping, and skipping to the referenced external symbol address through the long skipping instruction of the veneer code, and performing relocation dynamic loading.

In the relocation process, if there is short skipping exceeding the range, then it is required to transform the short skipping instruction exceeding the range into an effective short skipping instruction and a long skipping instruction, i.e. generating a veneer code, wherein the veneer code occupies two assembly instructions, i.e. eight bytes, the first four bytes are used for storing the long skipping instruction, and the last four bytes are used for storing the actual relocation target address, i.e. the absolute address of external symbol referenced by the dynamic application file. In this way, a long distance skipping may be realized by causing the effective short skipping instruction to direct to the veneer code, and skipping to the target address through the long skipping instruction of the veneer code, so that the dynamic loading is realized. Wherein the relocation process comprises the following two solutions:

I. traversing the section header table twice: during the first traversing, accumulating the number of times of exceeding the range of the short skipping, and then allocating required spaces for all veneer codes; during the second traversing, performing relocation, relocating the short skipping exceeding the range of the short skipping to the address where the long skipping instruction of the corresponding veneer code is located, and filling the veneer code.

II. traversing the section header table once, allocating larger space to the veneer code according to the number of external symbols referenced by the dynamic application file, instead of making a precise statistics on the number of times of exceeding the range of the short skipping at this time, and relocating the short skipping exceeding the range of the short skipping to the address where the long skipping instruction of the corresponding veneer code is located, and filling the veneer code.

Wherein the veneer code is not only applicable to the long distance skipping, but also applicable to the switching between the ARM state and the thumb state. When the veneer code is applied to the switching between the ARM state and the thumb state, the required space of the code segment remains unchanged, but the content of the code segment is different.

Compared with the relocation solution I, the relocation solution II is preferred for the following reasons: in the solution I, it is required to traverse the section header table twice, which takes more time. In addition, as long as the same symbols are referenced, the generated veneer codes are the same, in the solution II the same veneer codes are combined, while in the solution I the same veneer codes are not combined and the same symbol may be referenced several times, resulting in many repeated veneer codes. Therefore, compared with solution II, solution I uses more spaces.

Figure 2:
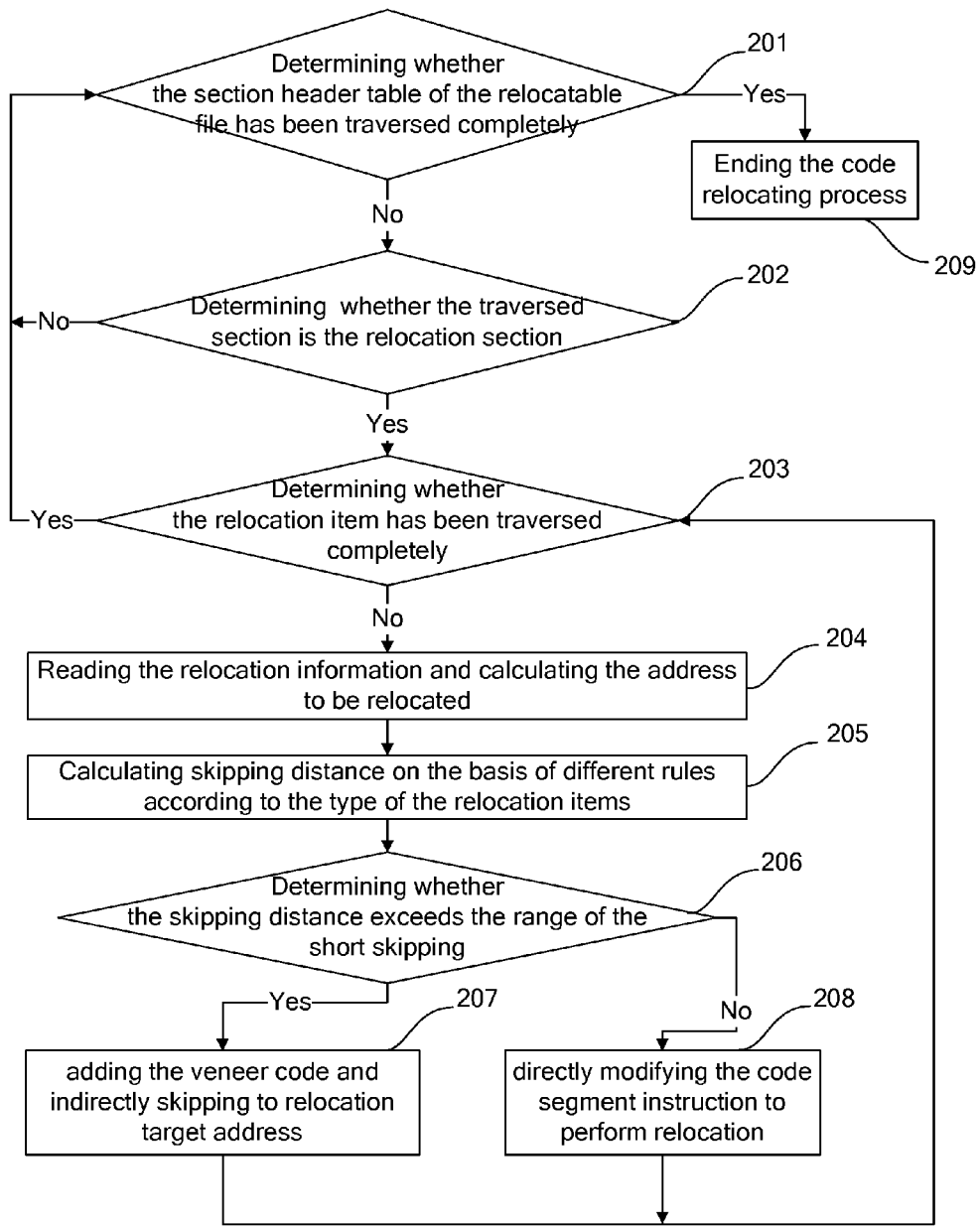
FIG. 2 shows a schematic flowchart illustrating code relocation according to the disclosure.

The code relocation process provided by the relocation solution II will be further described below with reference to FIG. 2, which mainly comprises the following steps.

Step 201, determining whether the section header table of the relocatable file has been traversed completely, if not, then executing step 202; otherwise, executing step 209;

wherein the relocation section is searched through traversing all of the items in the section header table of the relocatable file. Here, the relocation section refers to a normal section in the relocatable file whose attribute is relocatable. Wherein the relocation section only corresponds to one code section, consists of a plurality of relocation items, and used for storing the information of modifying other section contents, i.e. providing the information on how to modify the code section.

Step 202, determining whether the traversed section is the relocation section, if it is not the relocation section, then returning to step 201; otherwise, executing step 203;

the device for dynamically loading the relocatable file can find a relocation section through traversing the section header table according to the sh_type field of the section header, wherein the relocation section may make reference to other two sections: symbol section and the section to be modified; the data relation for performing relocation can be provided by the sh_info field and sh_link field in the members of the relocation section header, the sh_info field of the relocation section header indicates the applicable section index, and the sh_link field indicates the corresponding symbol section index. Because the current ELF file format specifies that one ELF file has only one symbol section, the sh_link field may not be used.

Step 203, determining whether the relocation item has been traversed completely, if yes, then returning to step 201; otherwise, executing step 204;

determining whether the relocation items have been traversed completely according to the number of the relocation items in the relocation section. Wherein the number of the relocation items in the relocation section is calculated according to the size of the relocation section and the size of the relocation item recorded in the relocation section header, i.e.:

the number of the relocation items=the size of the relocation section/the size of the relocation item the specific calculation method thereof may make reference to relevant specifications of the ELF file format. Here, the relocation item is the information included in the relocatable file on how to modify its section content, so as to allow the executable file and the shared target file to store the correct information of program mapping of the process.

Step 204, reading relocation information, and calculating the address to be relocated;

the relocation entries of relocation item describe how to modify the subsequent instructions and data fields, including members of r_offset field, r_info field and the like. Wherein the r_offset field provides the position applicable to the relocation action, and provides the offset of the first byte of the affected storage unit. For a relocatable file, the value of r_offset is the byte offset starting from the section header to the storage unit to be affected by the relocation. For an executable file or a shared target file, its value is the virtual address of the storage unit affected by relocation, while the r_info field provides the symbol table index to be relocated, and the relocation type to be performed. For example, the relocation item of a calling instruction may comprise the symbol table index of the called function.

In this embodiment, the offset of the relocated position in the affiliated section is obtained according to the relocation information. The r_offset field of the relocation item indicates the offset of the relocated position in the affiliated section, and the address to be relocated can be located through combining the offset with the initial address of the affiliated section. Wherein the affiliated section is the section to be relocated.

Here, the r_info field of the relocation item has two meanings and occupies four bytes. Wherein the low 8-bit of the r_info field, i.e. (unsigned char) r_info, represents the type of relocation item, the types of different relocation items have different relocation rules, and further details can refer to relevant rules of the ELF format. High 24-bit of r_info field, i.e. r_info>>8, represents the index of the symbol corresponding to relocation item in the symbol section, and the absolute address of the symbol can be found through is the index of the symbol section. The absolute address is the address with respect to 0, and the function calling is realized through address skipping.

Step 205, calculating skipping distance based on different rules according to the type of the relocation item;

the relocation type provides the value to be modified and the method on how to calculate the modified value, wherein for the type of the relocation item and the process of calculating the skipping distance, please refer to relevant specifications of the ELF file format, which will not be described in detail here.

Step 206, determining whether the skipping distance exceeds the range of the short skipping, if the skipping distance exceeds the range of the short skipping, then executing step 207; otherwise, executing step 208;

in this embodiment, the range of the short skipping ranges from +32 M to −32 M.

Step 207, adding veneer code, indirectly skipping to the relocation target address, and then returning to step 203;

wherein the veneer code space adds veneer code through one time allocation such as using pseudo codes: pc,=pSymAdrs; dcd pSymAdrs or the like according to the number of external reference symbols, the initial address of veneer code is filled into the address to be relocated to form an effective short skipping, and the long skipping instruction and referenced external symbol absolute address are filled into the veneer code, respectively. In this way, the effective short skipping instruction directs to the veneer code, and further indirectly skips to the referenced external symbol address (i.e. the relocation target address) through the long skipping instruction of the veneer code. Wherein the number of external reference symbols can be accumulated when determining whether it is a defined symbol or an undefined symbol, and the undefined symbol is the referenced external symbol.

Note that, in order to save the space, in this step, searching may be firstly performed to determine whether there is a generated veneer code, if the generated veneer code exists, then the initial address of the veneer code will be filled into the address to be relocated without generating the veneer code.

Step 208, directly modifying code segment instruction to perform relocation, then returning to step 203;

wherein the code segment instruction refers to the instruction held by the relocation target address. When the skipping distance does not exceed the range of the short skipping, directly modifying code segment instruction refers to filling the referenced external symbol address into the address to be relocated. Please refer to the specifications of ELF file format for detailed filling manner.

Step 209, ending the code relocating flow.

For simplicity, each of the above embodiments is expressed as a combination of a series of actions. However, persons skilled in the art would know that the disclosure is not limited to the order of the described actions as some steps may be performed in an alternative order or simultaneously according to the disclosure.

Figure 3:
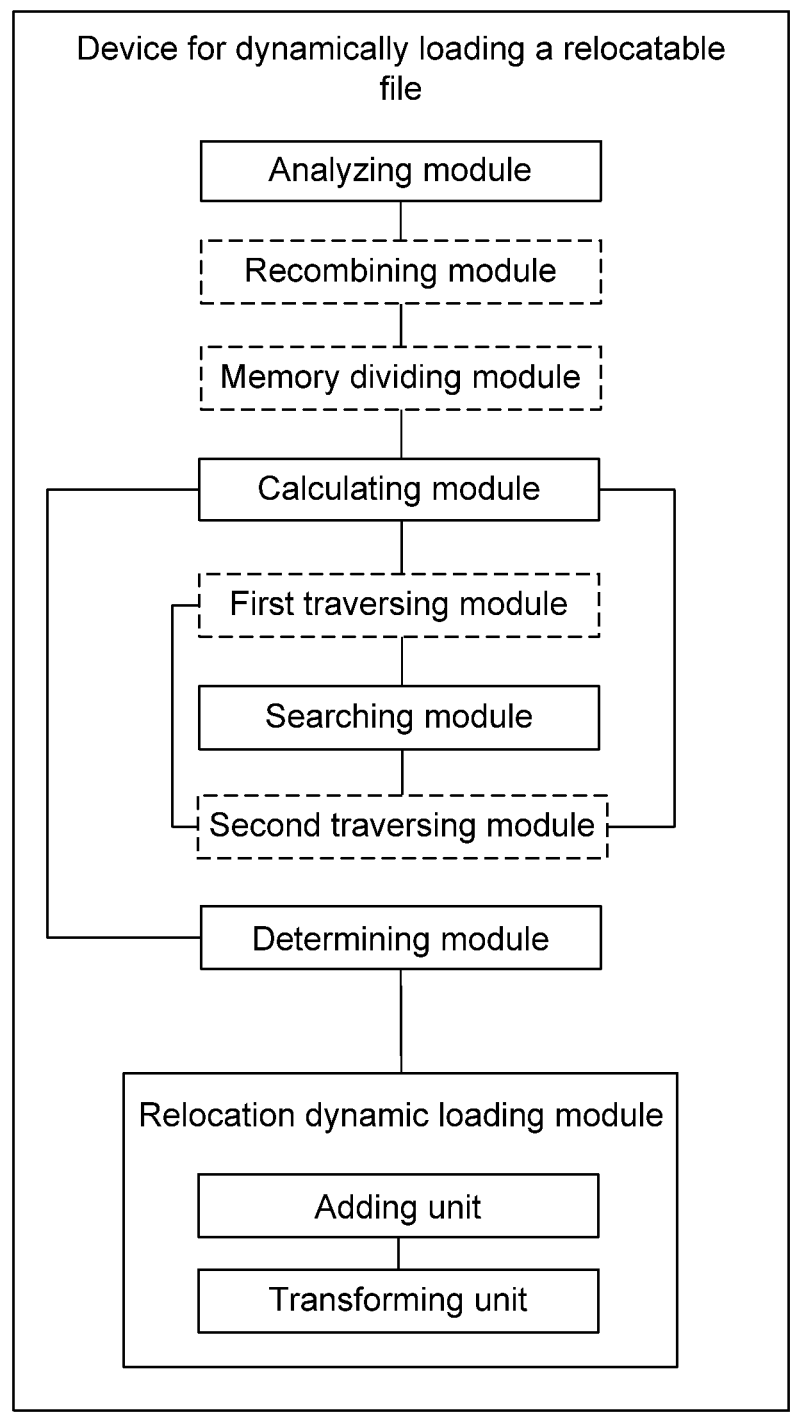
FIG. 3 shows a schematic diagram illustrating the structure of a device for dynamically loading a relocatable file according to the disclosure.

In order to implement the above method, the disclosure further provides a device for dynamically loading a relocatable file, as shown in FIG. 3, the device comprises: an analyzing module, a searching module, a calculating module, a determining module and a relocation dynamic loading module; wherein the analyzing module is configured to analyze the relocatable file;

the searching module is configured to search for a relocation section according to the information obtained by the analyzing module, and obtain a relocation target address;

the calculating module is configured to calculating an address to be relocated and a skipping distance;

the determining module is configured to determine whether the skipping distance exceeds a range of a short skipping, and inform a result of determining to the relocation dynamic loading module;

the relocation dynamic loading module is configured to fill the relocation target address into the address to be relocated; and add a veneer code, transform a short skipping exceeding the range of the short skipping into an effective short skipping and a long skipping, skip to the veneer code through the effective short skipping, and skip to the relocation target address through the long skipping instruction of the veneer code, and perform the relocation dynamic loading.

The above device further comprises: a recombining module and a memory dividing module; wherein the recombining module is configured to rank the sections of the three segments of TEXT, DATA and BSS to which the relocatable file belongs in an ascending order based on the section names and the section serial numbers, and ranking in the ascending order based on the section names is preferred;

the memory dividing module is configured to calculate and divide memory space required for loading a code of a dynamic application file, and read section content of the relocatable file, and write the content into the memory space of the section correspondingly;

correspondingly, the calculating module is further configured to calculate initial addresses of each code segment and each section.

The device further comprises: a first traversing module, and a second traversing module; wherein a first traversing module is configured to traverse a section header table, and inform the searching module when the traversal is completed;

a second traversing module is configured to traverse a relocation item, and inform the calculating module when the relocation item is started to be traversed, and inform the first traversing module when the relocation item is not traversed;

correspondingly, the searching module is further configured to inform the second traversing module when the relocation section is found.

Wherein the relocation dynamic loading module comprises: an adding unit configured to add the veneer code; a transforming unit configured to transform the short skipping exceeding the range of the short skipping into an effective short skipping and a long skipping, skip to the veneer code through the effective short skipping, and skip to a referenced external symbol address through a long skipping instruction of the veneer code.

In the above embodiments, the description to each embodiment has different emphasis, and those not described in detail in a certain embodiment may make reference to relevant descriptions of other embodiments. The above are only the preferred embodiments of the disclosure for describing and interpreting the disclosure and are not intended to limit the protection scope of the disclosure. Within the spirit and protection scopes of the claims of the disclosure, any modifications or equivalent replacements shall fall within the protection scope of the disclosure.

The invention claimed is:

1. A method for modifying a dynamic application file in a mobile terminal, comprising:

downloading another dynamic application file, which is a relocatable file, to the mobile terminal;

dynamically loading the relocatable file, including:

analyzing the relocatable file, searching for a relocation section according to information obtained through the analysis, and obtaining a relocation target address after the relocation section is found and calculating an address to be relocated and a skipping distance;

determining whether the skipping distance exceeds a range of a short skipping, if the skipping distance does not exceed the range of the short skipping, then filling the relocation target address into the address to be relocated to perform relocation loading; if the skipping distance exceeds the range of the short skipping, then adding a veneer code and making a skipping exceeding the range of the short skipping skip indirectly to the relocation target address to perform relocation loading; and wherein adding the veneer code comprises:

generating the veneer code, and filling a long skipping instruction and the external symbol address which is referenced by the dynamic application file into the veneer code, respectively; filling an initial address of the veneer code into the address to be relocated to form an effective short skipping, an effective short skipping instruction directs to the veneer code; and making the skipping exceeding the range of the short skipping skip indirectly to the relocation target address comprises: skipping to the veneer code through the effective short skipping, then skipping to the referenced external symbol address through a long skipping of the veneer code.

2. The method according to claim 1, further comprising: before analyzing the relocatable file:

generating a system symbol table; recombining the relocatable file according to attributes of sections of the relocatable file, calculating and allocating memory space required for loading a code of a dynamic application file, and calculating an initial address of each code segment, reading section content of the relocatable file, and writing the content into the allocated memory space of the section correspondingly;

wherein recombining the relocatable file comprises: ranking sections of three segments of TEXT, DATA and Block Started by Symbol (BSS) to which the relocatable file belongs in an ascending order based on section names and the section serial numbers, and ranking in the ascending order based on the section names is preferred.

3. The method according to claim 2, wherein obtaining the relocation target address comprises:

analyzing the relocatable file to obtain a section header of a symbol section, traversing a section header table of the relocatable file according to a sh_type field of the section header, and searching for the symbol section of the relocatable file;

determining whether a symbol of the relocatable file is an undefined symbol according to a st_shndx field of a symbol item of the symbol section;

when the symbol of the relocatable file is an undefined symbol, searching the system symbol table to obtain a symbol address of the undefined symbol, and using the symbol address of the undefined symbol as an external symbol address referenced by the dynamic application file; the external symbol address referenced by the dynamic application file is the relocation target address.

4. The method according to claim 2, wherein calculating the address to be relocated comprises:

obtaining an offset of a relocated position in an affiliated section according to relocation information; and obtaining the address to be relocated by adding an obtained offset to an initial address of the affiliated section.

5. The method according to claim 2, further comprising: after the relocation section is found, determining whether relocation items have been traversed completely, and if the relocation items have not been traversed completely, then obtaining the relocation target address;

if the relocation items have been traversed completely, then determining whether the section header table has been traversed completely, and if the section header table has not been traversed completely, keeping on searching to determine whether there is relocation section; if the section header table has been traversed completely, ending the relocatable dynamic loading process.

6. The method according to claim 3, wherein calculating the address to be relocated comprises:

obtaining an offset of a relocated position in an affiliated section according to relocation information; and obtaining the address to be relocated by adding an obtained offset to an initial address of the affiliated section.

7. The method according to claim 3, further comprising: after the relocation section is found, determining whether relocation items have been traversed completely, and if the relocation items have not been traversed completely, then obtaining the relocation target address;

if the relocation items have been traversed completely, then determining whether the section header table has been traversed completely, and if the section header table has not been traversed completely, keeping on searching to determine whether there is relocation section; if the section header table has been traversed completely, ending the relocatable dynamic loading process.

8. The method according to claim 1, wherein calculating the address to be relocated comprises:

obtaining an offset of a relocated position in an affiliated section according to relocation information; and obtaining the address to be relocated by adding an obtained offset to an initial address of the affiliated section.

9. The method according to claim 1, further comprising: after the relocation section is found, determining whether relocation items have been traversed completely, and if the relocation items have not been traversed completely, then obtaining the relocation target address;

if the relocation items have been traversed completely, then determining whether the section header table has been traversed completely, and if the section header table has not been traversed completely, keeping on searching to determine whether there is relocation section; if the section header table has been traversed completely, ending the relocatable dynamic loading process.

10. The method according to claim 1, wherein calculating the address to be relocated comprises:

obtaining an offset of a relocated position in an affiliated section according to relocation information; and obtaining the address to be relocated by adding an obtained offset to an initial address of the affiliated section.

11. The method according to claim 1, further comprising: after the relocation section is found, determining whether relocation items have been traversed completely, and if the relocation items have not been traversed completely, then obtaining the relocation target address;

if the relocation items have been traversed completely, then determining whether the section header table has been traversed completely, and if the section header table has not been traversed completely, keeping on searching to determine whether there is relocation section; if the section header table has been traversed completely, ending the relocatable dynamic loading process.

12. A mobile device for dynamically loading a relocatable file, comprising:
an analyzing module configured to analyze the relocatable file;
a searching module configured to search for a relocation section according to information obtained by the analyzing module, and obtain a relocation target address;
a calculating module configured to calculate an address to be relocated and a skipping distance;
a determining module configured to determine whether the skipping distance exceeds a range of a short skipping, and inform a result of determining to a relocation dynamic loading module;
the relocation dynamic loading module configured to fill the relocation target address into the address to be relocated; and add a veneer code, transform the short skipping exceeding the range of the short skipping into an effective short skipping and a long skipping, skip to the veneer code through the effective short skipping, and then skip to the relocation target address to perform relocation dynamic loading; and
wherein adding the veneer code comprises:
generating the veneer code, and filling a long skipping instruction and the external symbol address which is referenced by the dynamic application file into the veneer code, respectively; filling an initial address of the veneer code into the address to be relocated to form an effective short skipping, an effective short skipping instruction directs to the veneer code; and making the skipping exceeding the range of the short skipping skip indirectly to the relocation target address comprises: skipping to the veneer code through the effective short skipping, then skipping to the referenced external symbol address through a long skipping of the veneer code.

13. The device according to claim 12, further comprising:
a recombining module configured to rank sections of three segments of TEXT, DATA and BSS to which the relocatable file belongs in an ascending order based on section names and section serial numbers, wherein ranking in the ascending order based on the section names is preferred;

a memory dividing module configured to calculate and divide memory space required for loading a code of a dynamic application file, and read section content of the relocatable file, and write the content into the memory space of the section correspondingly;
wherein the calculating module is further configured to calculate initial addresses of each code segment and each section.

14. The device according to claim 13, further comprising:
a first traversing module configured to traverse a section header table, and inform the searching module when the traversal is completed;
a second traversing module configured to traverse a relocation item, and inform the calculating module when the relocation item is started to be traversed, and inform the first traversing module when the relocation item is not traversed;
wherein the searching module is further configured to inform the second traversing module when the relocation section is found.

15. The device according to claim 13, wherein the relocation dynamic loading module comprises:
an adding unit configured to add the veneer code;
a transforming unit configured to transform the short skipping exceeding the range of the short skipping into an effective short skipping and a long skipping, skip to the veneer code through an effective short skipping skip, and skip to a referenced external symbol address through a long skipping instruction of the veneer code.

16. The device according to claim 12, further comprising:
a first traversing module configured to traverse a section header table, and inform the searching module when the traversal is completed;
a second traversing module configured to traverse a relocation item, and inform the calculating module when the relocation item is started to be traversed, and inform the first traversing module when the relocation item is not traversed;
wherein the searching module is further configured to inform the second traversing module when the relocation section is found.

17. The device according to claim 12, wherein the relocation dynamic loading module comprises:
an adding unit configured to add the veneer code;
a transforming unit configured to transform the short skipping exceeding the range of the short skipping into an effective short skipping and a long skipping, skip to the veneer code through an effective short skipping skip, and skip to a referenced external symbol address through a long skipping instruction of the veneer code.

* * * * *